Feb. 9, 1937. F. T. IRGENS 2,070,405
OUTBOARD MOTOR
Filed July 1, 1932
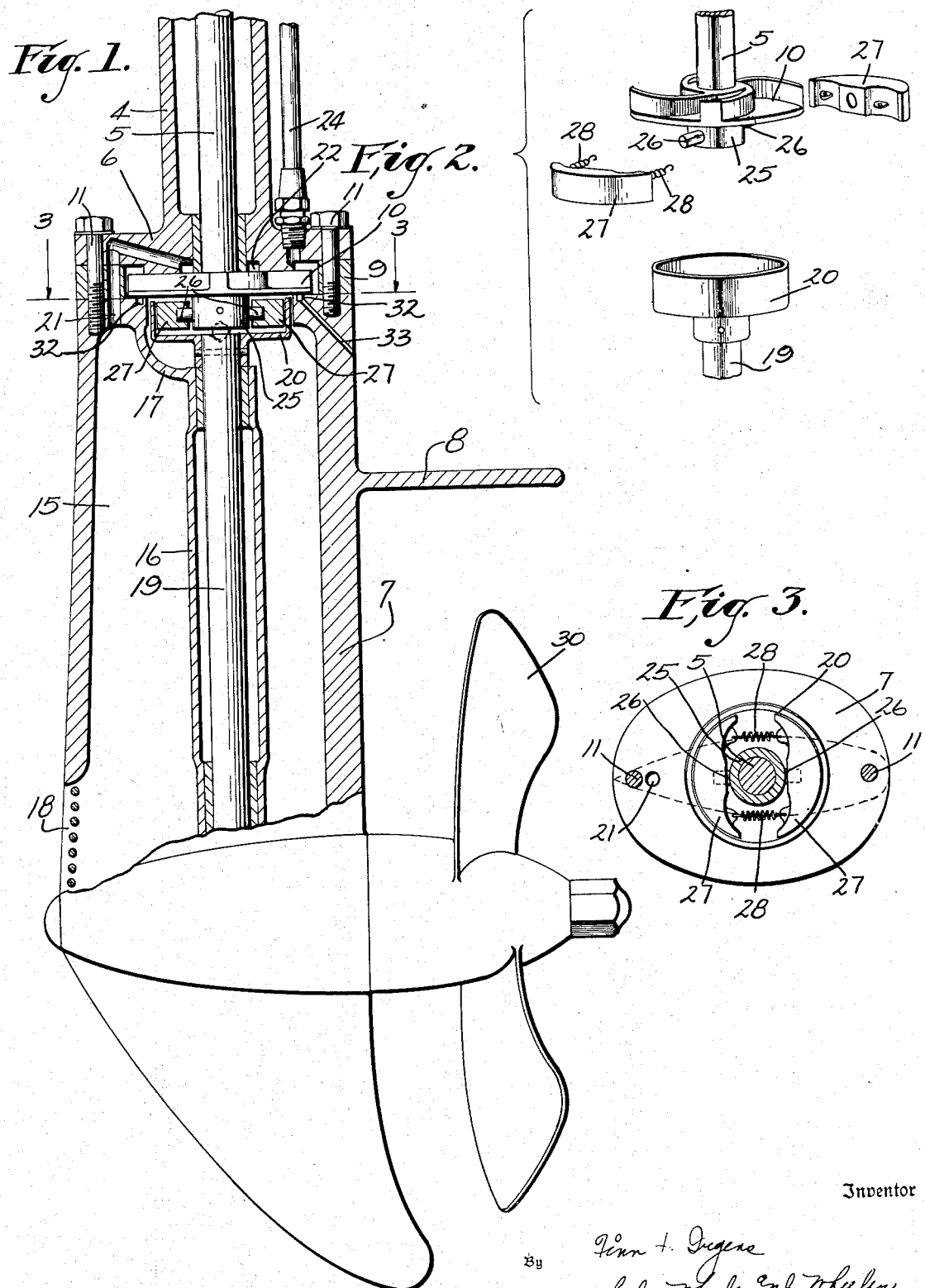

Patented Feb. 9, 1937

2,070,405

UNITED STATES PATENT OFFICE 2,070,405

OUTBOARD MOTOR

Finn T. Irgens, Wauwatosa, Wis., assignor to Outboard Motors Corporation, Milwaukee, Wis., a corporation of Michigan Application July 1, 1932, Serial No. 620,391

8 Claims. (Cl. 115—17)

This invention relates to improvements in outboard motors.

It is the object of the invention to provide an outboard motor with a form of clutch which will permit the drive shaft to idle at low speeds without turning the propeller shaft and which, at higher speeds, will exert upon the propeller shaft a yieldable driving torque subject to slippage upon encountering a submerged obstacle, and adapted at all speeds to maintain a substantially uniform differential between the torque transmitted and the point at which slippage will occur.

Numerous attempts have been made to provide outboard motors with clutches, feathering propellers and the like, for enabling the motors to be idled without producing motion of the boat. All of such devices have involved relatively expensive mechanisms for accomplishing the desired objective, and have required the intelligent manipulation of controls by the operator of the motor. It is one of the specific purposes of the invention to provide a centrifugally operated clutch which will be entirely automatic in its operation in accordance with engine speeds, thus requiring no controls, no expensive or delicate parts, and no special manipulation by the operator.

Slip clutches heretofore designed for the protection of outboard motors in the event that their propeller strikes submerged obstacles, have been subject to the objection that they have to be designed for their maximum power requirements. In other words, the slip clutch must always be adapted to transmit the full torque of the engine at maximum engine speeds. Although it may require only a slight resistance to propeller movement at full load to cause the clutch to slip, it will be obvious that with any lesser engine speed and a consequently reduced torque load, the resistance of the clutch to slippage will be relatively excessive, so that a very severe shock to the propeller may not be sufficient to release the clutch and may do considerable damage to the motor. The automatically operable centrifugal clutch to which the present invention relates, engages frictionally with a pressure approximately directly proportioned to the speed of the engine, so that regardless of the speed at which the engine may be operated throughout its normal driving range, a given shock of minimum intensity will always effect a slippage of the clutch and consequent protection of the driving parts.

A further object of the invention has reference to the particular location of the clutch at the top of the lower unit, where sufficient room may be provided for it without affecting the underwater contour of the lower unit, and where the clutch may conveniently be assembled with the water pump and rendered immediately accessible upon a separation of the lower unit from the shaft housing of the motor.

In the drawing:

Figure 1 is a vertical axial section from front to rear through the lower portion of an outboard motor embodying the present invention.

Figure 2 is a detail view in perspective showing in dissociated positions the component parts of the pump and centrifugal clutch which are incorporated in the device shown in Figure 1.

Figure 3 is a detail view taken in the plane indicated at 3—3 in Figure 1.

Like parts are identified by the same reference characters throughout the several views.

The power head and bracket mounting may be of any approved design and hence are not illustrated. The conventional shaft housing 4 encloses a drive shaft 5 and terminates in a flange or attachment head 6.

The lower unit is preferably "stratified" or subdivided horizontally into a plurality of sections in accordance with the disclosure of a companion application entitled "Lower units for outboard motors" and executed of even date herewith. The device herein illustrated differs from that disclosed in said companion application in that the gear casing section 7 of the lower unit extends to a point above the water line and is provided integrally with an anti-cavitation plate 8. The top section of the lower unit comprises an elliptical plate 9 serving as a pump casing for the pump runner 10 mounted at the lower end of drive shaft 5. Bolts 11 detachably connect the lower unit sections 7 and 9 with each other and with the flange or head 6 of shaft housing 4.

The gear casing section 7 of the lower unit has a forwardly disposed water passage 15 formed by shaft bearing partition 16 and web 17, and having an inlet port at 18. In the partition 16 are suitable bushings for the lower drive shaft section 19, to the upper end of which is fitted the cup-shaped drum 20 of the centrifugal clutch hereinafter to be described.

A water duct 21 formed by complementary bores in castings 7, 9 and 6 leads to the annular inlet port 22 which feeds water to the spaces between the vanes of the pump runner 10. The water is centrifugally discharged by the pump runner in the course of its operation, leads to the interior of the pump casing section 9 of the lower unit, and thence to a supply pipe 24 for the engine jacket.

The hub 25 of the pump impeller 10 is provided for clutch purposes with radial pins at 26 upon which the clutch shoes 27 are radially reciprocable. These shoes are normally drawn centrally toward the hub by means of tension springs 28 which connect them. At low speeds of drive shaft 5 the tension of springs 28 will overcome the centrifugal force acting on shoes 27, and the shoes will be held out of engagement with drum 20, thus transmitting no motion to driven shaft 19 and the propeller 30, which will be understood to be connected to shaft 19 through the usual gearing in casing 7. At higher speeds of shaft 5 the shoes 27 will be caused to engage drum 20 with a pressure generally proportioned to the speed of shaft 5, and hence to the torque to be transmitted through the clutch.

If, by reason of an obstruction suddenly encountered by propeller 30, the resistance to motion of shaft 19 exceeds the frictional driving capacity of the clutch, the clutch will slip and, inasmuch as the driving capacity of the clutch depends on the engine speed, the point at which it will slip may be made to follow closely beneath the increasing torque requirements of the device so that, throughout the range of operative speeds of shaft 5 and propeller 30, the amount of shock on propeller 30 required to cause slippage of the clutch, will remain constant in an approximate way.

To prevent leakage of water into the clutch from the pump chamber an intercepting channel is preferably provided at 32, and from this channel a drain duct 33 leads to the outside of the lower unit section 7.

I claim:

1. In an outboard motor, the combination with driving and driven shafts, of a pump runner carried by the driving shaft, a driven clutch member carried by the driven shaft, and clutch means carried by said pump runner and releasably engageable with the clutch member of the driven shaft.

2. In an outboard motor, the combination with a lower unit provided with a shaft section, of a shaft housing provided with a driving shaft section, and means connecting said shaft housing and lower unit, of a pump runner disposed on the driving shaft section, a drum connected with said first mentioned shaft section, centrifugal clutch shoes mounted upon said pump runner within said drum, and means opposing the centrifugal separation of said shoes, said means being adapted to be overcome when said driving shaft section reaches a predetermined speed and said shoes being thereupon engageable with said drum for the driving of said first mentioned shaft section.

3. In an outboard motor, the combination with a driven shaft section and a propeller connected to be driven therefrom, of a clutch unit on said driven shaft section, a driving shaft section having a complementary clutch unit, and a water pump connected to said driving shaft section to receive motion continuously therefrom irrespective of the operation of said driven shaft section, said water pump transmitting motion to the driving shaft clutch unit.

4. In an outboard motor, the combination with a driven shaft section and a propeller operatively connected to receive motion therefrom, of a driving shaft section, a pump rotor connected with said driving shaft section, a clutch means directly mounted on said pump rotor, and driven clutch means connected with said driven shaft section and operatively disposed to receive motion from said first mentioned clutch means.

5. In an outboard motor, the combination with a driven shaft section and a propeller operatively connected to receive motion therefrom, of a driving shaft section, a pump rotor connected with said driving shaft section, a clutch means directly mounted on said pump rotor, and driven clutch means connected with said driven shaft section and operatively disposed to receive motion from said first mentioned clutch means, and casing means enclosing said clutch means and pump and provided internally with a water passage having an inlet opening below said clutch and extending about said clutch and pump rotor in communication with said rotor near the upper axial portion thereof.

6. An outboard motor comprising the combination with a shaft housing, a drive shaft therein, a lower unit, a driven shaft therein and a propeller operatively connected to receive motion from the driven shaft, of a pump runner mounted at the lower end of the driving shaft, a clutch drum mounted at the upper end of the driven shaft, clutch means associated with said runner and disposed within said drum for releasably effecting a coupling between said shafts, and a water conduit extending through said lower unit and having a submerged inlet below said clutch drum extending about said drum and runner to a position above said runner and communicating with said runner adjacent the upper central portion thereof.

7. In an outboard motor, the combination with shaft housing means having a cavity and driving and driven shafts provided with bearings in said means, of a water pump and clutch assembly unitarily mounted in said cavity, said clutch including driving and driven elements and said water pump being connected with the driving clutch element to receive motion therefrom irrespective of the motion of the driven shaft, and means providing passages to and from said pump.

8. In an outboard motor, the combination with a shaft housing and lower unit assembly provided with a pump chamber, of driving and driven shafts extending through said chamber, a pump runner on the driving shaft within said chamber, water connections to and from said pump, and an automatically operable centrifugal clutch disposed in said pump chamber and having relatively engageable and disengageable clutch elements operatively connected respectively with the driving and driven shafts, the remainder of said assembly having a width in cross section less than that of said chamber, said clutch being accommodated in said chamber without occasioning elsewhere an enlargement of the section of said assembly.

FINN T. IRGENS.